United States Patent [19]

Hoying et al.

[11] Patent Number: 4,796,874
[45] Date of Patent: Jan. 10, 1989

[54] ELECTRONIC HYDRAULIC MOUNT WITH CONTINUOUSLY VARIABLE CONTROL

[75] Inventors: John F. Hoying, Bellbrook; Stanley E. Smith, Dayton, both of Ohio

[73] Assignee: General Motors Corporation, Detroit, Mich.

[21] Appl. No.: 103,756

[22] Filed: Oct. 2, 1987

[51] Int. Cl.$^4$ .............................................. F16M 5/00
[52] U.S. Cl. .................................. 267/140.1; 248/562; 248/636
[58] Field of Search .................. 267/140.1, 292, 293, 267/294, 119, 140, 104.3, 141.3, 141.4, 141.5, 153; 248/562, 636, 603, 609, 614, 632; 188/299, 319

[56] References Cited

U.S. PATENT DOCUMENTS

| | | | |
|---|---|---|---|
| 3,069,846 | 12/1962 | Buescher | 251/129.01 |
| 4,561,524 | 12/1985 | Mizumukai et al. | 188/319 |
| 4,635,910 | 1/1987 | Ozawa et al. | 267/140.1 |
| 4,709,779 | 12/1987 | Takehara | 267/140.1 |

Primary Examiner—Andres Kashnikow
Assistant Examiner—Mark T. Le
Attorney, Agent, or Firm—R. L. Phillips

[57] ABSTRACT

A hydraulic mount assembly includes a pair of mounting members connected to each other through a hollow elastomeric body. The body is closed by a resilient diaphragm so as to form a cavity for damping liquid. A partition or plate is provided to divide the fluid filled cavity into two distinct chambers. A primary chamber is formed between the partition and the interior wall of the body. A secondary chamber is formed between the partition and the interior wall of the diaphragm. The partition includes at least two flow passages connecting the two chambers. A sliding gate extends across the opening to one of the passages. This gate is displaceable to direct an infinitely variable flow of liquid between the primary and secondary chambers to provide an infinitely variable damping effect. The gate is actuated by a linear solenoid providing this desired proportional operation. The other passage opening remains fully open at all times. In another embodiment, a rotary valve extends across the passage entry. In still another embodiment the solenoid is driven by a pulse width modulator. A control circuit with on board transducers is provided to monitor vehicle operating and road conditions. A microprocessor acts in response to the sensed conditions and sends a control signal to operate the linear solenoid to provide the desired damping.

3 Claims, 2 Drawing Sheets

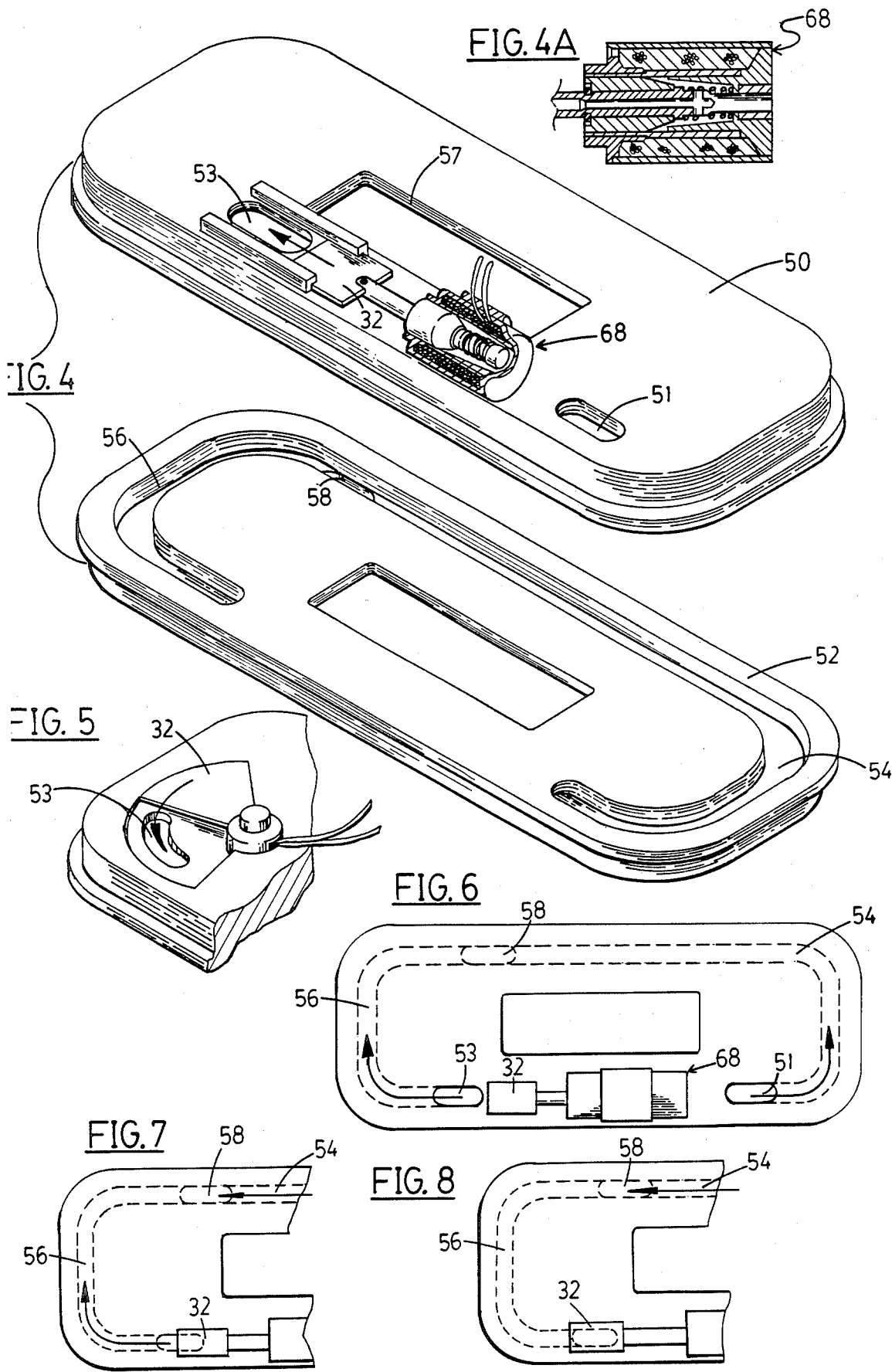

ELECTRONIC HYDRAULIC MOUNT WITH CONTINUOUSLY VARIABLE CONTROL

TECHNICAL FIELD

The present invention relates generally to hydraulic mounts for vibration damping and, more particularly, to an electronically controlled hydraulic mount assembly designed to provide variable damping characteristics.

BACKGROUND OF THE INVENTION

A variety of mount assemblies are presently available to isolate vehicle vibrations, such as for automobile and truck engines and transmissions. One of the most popular mounts today is the hydraulic-elastomeric mount of the type disclosed in U.S. Pat. No. 4,588,173 to Gold et al., issued May 13, 1986 and entitled "Hydraulic-Elastomeric Mount".

The hydraulic mount assembly of this prior invention includes a reinforced, hollow rubber body that is closed by a resilient diaphragm so as to form a cavity. This cavity is partitioned by a plate into two chambers that are in fluid communication through a relatively large central orifice in the plate. The first or primary chamber is formed between the orifice plate and the body. The secondary chamber is formed between the plate and the diaphragm.

A decoupler is positioned in the orifice of the plate and reciprocates in response to the vibrations. The decoupler movement alone accommodates small volume changes in the two chambers. When, for example, the decoupler moves toward the diaphragm, the volume of the primary chamber increases and the volume of the secondary chamber decreases. In this way, at certain small vibratory amplitudes and high frequencies, fluid flow between the chambers is substantially avoided and undesirable hydraulic damping is eliminated. In effect, this freely floating decoupler is a passive tuning device.

In addition to the large central orifice, an orifice track with a smaller flow passage is provided, extending around the perimeter of the orifice plate. Each end of the track has one opening; one communicating with the primary chamber and the other with the secondary chamber. The orifice track provides the hydraulic mount assembly with another passive tuning component, and when combined with the freely floating decoupler provides at least three distinct dynamic modes of operation. The operating mode is primarily determined by the flow of the fluid between the two chambers.

More specifically, small amplitude vibrating inputs, such as from smooth engine idling or the like, produce no damping due to decoupling. On the other hand, large amplitude vibrating inputs produce high velocity fluid flow through the orifice track, and accordingly a high level of damping force and smoothing action. As a third (intermediate) operational mode of the mount, medium amplitude inputs produce lower velocity fluid flow through the orifice track resulting in the desired medium level of damping. In each instance, as the decoupler moves from one seated position to the other, a relatively limited amount of fluid can bypass the orifice track by moving around the sides of the decoupler to smooth the transition between the operational modes.

Recent developments in hydraulic mount technology have led to the advent of electronic control of the damping characteristics of the mount. Advantageously, such a mount allows active rather than passive control of the dynamic characteristics of a mount. Thus, more efficient and effective isolation of vibrations and suppression of noises may be provided.

A previously developed hydraulic mount includes a rotary solenoid to open and close a fluid bypass port between the two fluid-filled chambers of the mount. When the bypass valve is closed, high levels of damping and rate are generated as fluid is forced from one chamber to the other through a small, fixed orifice. Conversely, when the bypass valve is open the fluid bypasses the small, fixed orifice and the mount generates very little fluid damping.

While this prior mount does provide for some control of damping characteristics in response to vehicle operating conditions, it is not without its disadvantages. More specifically, the solenoid actuator is mounted external to the mount body. Unless a high integrity seal is maintained between the mount body and the solenoid actuator, the mount fails. Due to the hostile environment of the mount, such a seal is very difficult to maintain over time. This results in the mount being susceptible to premature failure.

U.S. Pat. No. 4,583,723 to Ozawa discloses an hydraulic elastomeric mount addressing this problem. The Ozawa mount includes an electromagnetic coil mounted within the bottom plate of the mount. The movement of a two portion plate between the two chambers of the mount is controlled by the coil. This system provides either minimum damping by allowing maximum plate movement when the coil is deenergized, or maximum damping by restricting the movement when energized.

Essentially both of the prior art mounts operate in an on/off mode providing essentially either mushy or hard dynamic characteristics. Thus, effective vibration damping and noise suppression are provided by these mounts over only a relatively narrow vibration frequency range. Consequently, mounts of this type are most effectively utilized for specific applications where the vehicle component or member being damped exhibits vibrations that peak at one particular resonance frequency to which the mount is matched.

Adjustable mounts such as these, have thus proved only marginally effective in active damping situations that exist with engines and transmissions in motor vehicles. In these environment peak vibrations occur at more than one resonance frequency depending upon vehicle operating conditions. For example, an engine may vibrate at one resonance frequency during lugging, at another during rapid acceleration and at still another during sustained high RPM operation.

Two recent developments provide for stepped damping in response to sensed vehicle conditions. This stepped damping is accomplished by a three-way rotary valve in one hydraulic mount, and a four position sliding gate in the other mount. These recent developments are disclosed and claimed in the copending patent applications, Electronic Motor Mount with Rotary Flow Control Valve, Ser. No. 096,637, filed Sept. 14, 1987 and Electronic Hydraulic Mount-Internal Solenoid, Ser. No. 068,428, filed July 1, 1987, respectively, assigned to the same assignee as the present invention. These electronic mounts represent an improvement over the existing prior art because they allow stepped damping rather than merely digital or on/off damping operation.

However, need is identified for an improved electronic hydraulic mount assembly that provides truly proportional or infinitely variable high efficiency damping so as to more completely accommodate the wide range of multiple resonance frequencies exhibited by the component being damped. In this way the dynamic characteristics of the mount can be tuned, either manually or automatically, to provide even more effective and efficient damping and noise suppression of the member over the entire range of expected operating conditions.

SUMMARY OF THE INVENTION

Accordingly, it is a primary object of the present invention to provide a hydraulic mount assembly overcoming the limitations and disadvantages of the prior art.

Another object of the present invention is to provide a tunable hydraulic mount assembly having a self-contained, sealed construction that is not only inexpensive to build but provides highly reliable operation.

An additional object of the present invention is to provide a hydraulic mount assembly that is tunable on a proportional basis across the full range resonance frequencies characteristic of the vehicle component being damped so as to more efficiently and effectively isolate vibrations and suppress noise over the full range of vehicle operating and road conditions.

Yet another object of the present invention is to provide a hydraulic mount that allows the dynamic characteristics to be actively controlled by infinitely varying the flow of fluid between the two chambers of the mount assembly in response to an electronic control circuit.

Additional objects, advantages, and other novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

To achieve the foregoing and other objects, and in accordance with the purposes of the present invention as described herein, an actively tunable hydraulic mount assembly is provided for damping and isolating engine and transmission vibrations. The preferred embodiment of the mount assembly selected to illustrate the invention includes a pair of mounting members connected to each other through a hollow elastomeric body. This hollow body is closed by a resilient diaphragm so as to form a cavity for a damping liquid, which may be a commercial engine antifreeze coolant. A partition or plate is provided to divide the fluid filled cavity into two distinct chambers. The primary chamber is formed between the partition and the interior wall of the hollow body. The secondary chamber is formed between the partition and the interior wall of the diaphragm.

The partition further includes a decoupler and at least two passages or orifice tracks connecting the two chambers. According to an important aspect of the invention, a sliding gate extends across the entry to one of the passages. This gate serves as an infinitely variable valve which is displaceable to direct the flow of fluid between the primary and secondary chambers through the gated passage in the partition. The other passage remains open. The positioning of the gate is positively controlled by means of a linear solenoid actuator mounted within the partition. In another embodiment, the sliding gate is replaced by a rotary gate actuated by a rotary solenoid. In operation, these embodiments provide infinitely variable damping levels for a given hydraulic mount.

In operation of the mount, vibration forces within the design amplitudes and frequencies of the mount produce alternate contraction/expansion of the hollow body and primary chamber. When the vibration is initiated, the liquid first causes reciprocation of the decoupler. Certain small vibratory amplitudes usually produced at high frequencies; for example, such as during smooth engine idling, are accommodated by the alternate increases and decreases in the chamber volumes resulting from decoupler reciprocation. Thus, significant fluid flow through the restricted passages or tracks between the chambers is avoided and undesirable hydraulic damping is prevented.

In contrast, during large vibratory amplitudes, the decoupler ceases reciprocating and all damping fluid flow occurs through the passages between the primary and secondary chambers. This flow is through both the open and valved passages and the relative flow is varied by the valve position, providing enhanced dynamic control.

Upon contraction of the primary chamber, liquid entering the secondary chamber causes stretching of the diaphragm, increasing the volume of the secondary chamber. Then upon reversal of the force, resulting in expansion of the primary chamber, the stretched diaphragm contracts forcing liquid back to the primary chamber, completing the damping cycle. In this manner, the mount advantageously provides vibration isolation and noise suppression with the utmost efficiency.

In addition to the above basic structure, the mount assembly of the invention is characterized by the active tuning concept referred to briefly above. More specifically, the mount includes means for infinitely matching the dynamic characteristics of the mount to the frequency exhibited by the member being damped under any particular operating condition. The mount assembly of the invention effectively provides for the adjusting of the liquid flow between the two chambers over a predetermined frequency range in direct and proportional response to actual vehicle operating conditions.

Of particular significance, the mount assembly includes a control means that may be utilized to actively regulate the liquid flow between the chambers in response to the vibration being produced at any given time under vehicle operating and road conditions. Thus, the mount assembly may be made directly responsive to sensing means, such as vehicle mounted transducers, so as to more efficiently and effectively isolate vibrations. This active control means for the mount of the invention is highly effective over a complete range of vibration amplitudes and frequencies and represents an advance over control previously obtainable with purely digital or stepped arrangements.

Preferably, the control of flow between the chambers is accomplished by variably positioning the valve across the opening, thereby providing the desired rate of fluid flow along the valved track. In the embodiment described, one passage is open allowing flow between the chambers and the other is valved thusly providing a tunable dampener. In another embodiment the solenoid is controlled by a pulse width modulator to energize and deenergize the solenoid at different frequencies and inputs providing the same infinitely variable damping levels for a given hydraulic mount. Accordingly, the component is damped at optimal efficiency under any combination of vehicle operating and road conditions.

Still other objects of the present invention will become apparent to those skilled in this art from the following description when they are shown and described a preferred embodiment of this invention, simply by way of illustration of one of the modes best suited to carry out the invention. As it will be realized, the invention is capable of other different embodiments and its several details are capable of modifications in various, obvious aspects all without departing from the invention. Accordingly, the drawings and descriptions will be regarded as illustrative in nature and not as restrictive.

BRIEF DESCRIPTION OF THE DRAWINGS

The accompanying drawing incorporated in and forming a part of the specification, illustrates several aspects of the present invention and together with the description serves to explain the principals of the invention. In the drawing:

FIG. 4 is an enlarged exploded view of the partition of the present invention showing the damping liquid flow passages, the gate for directing the flow of liquid and the linear actuating solenoid (broken away for clarity);

FIG. 4A is an enlarged cross-sectional view of the linear solenoid as shown in FIG. 4 and more fully described in the copending patent application Ser. No. 017,932, supra;

FIG. 5 depicts a rotary valve embodiment of the present invention including a rotary valve actuator;

FIG. 6 is a top schematic view of the partition showing the flow path through the preferred FIG. 4 embodiment with the gate open in the valved passage thus allowing unrestricted flow along both passages;

FIG. 7 is a partial top view of the partition showing the gate in a partially open position allowing a restricted flow rate along the valved flow passage and;

FIG. 8 is another partial top view of the partition showing the gate closed, allowing the flow of damping fluid only through the unvalved passage.

Figure 1:
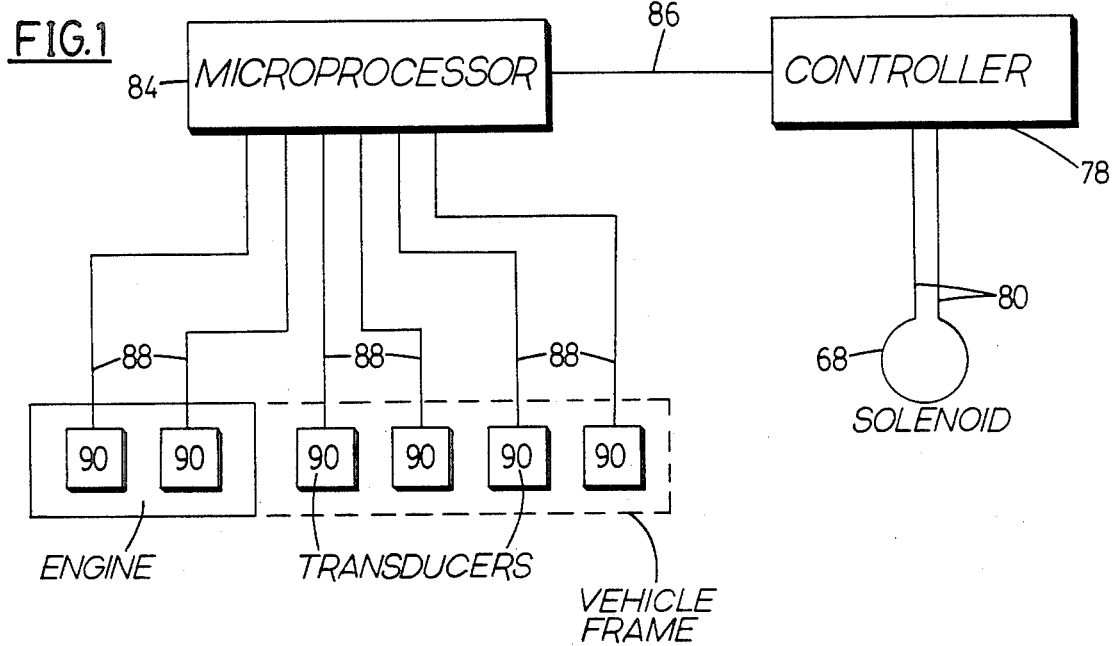
FIG. 1 is a schematical representation of the control circuit of the hydraulic mount assembly of the present invention.

Reference will now be made in detail to the present preferred embodiment of the invention, an example of which is illustrated in the accompanying drawing.

DETAILED DESCRIPTION OF THE INVENTION

Reference is now made to the drawing figures showing the improved hydraulic-elastomeric mount assembly of the present invention particularly adapted for mounting a component, such as an internal combustion engine in a vehicle. The dynamic characteristics of the mount assembly may be adjusted or tuned to meet the specific application. As a result, the desired amplitude control, as well as the coefficient of damping and resulting dynamic rate best suited to isolate a particular vibration condition, can be obtained.

Figure 2:
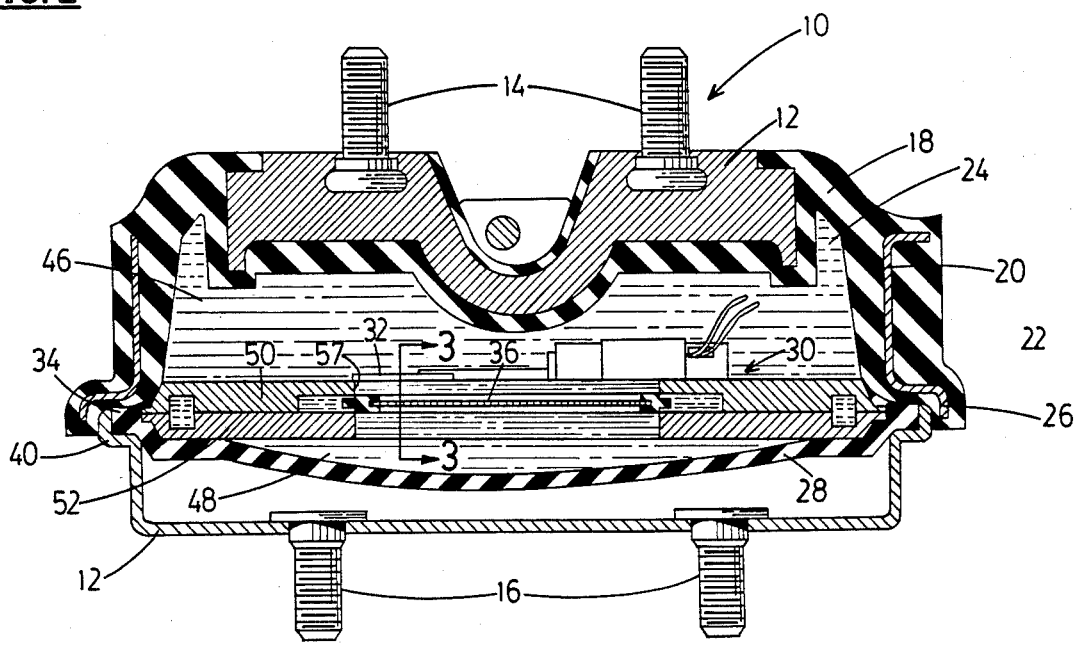
FIG. 2 is a cross-sectional view of the hydraulic mount assembly.

The mount assembly includes a cast metal mounting member 10 and stamped sheet metal mounting member 12, as shown in FIG. 2. The mounting members 10 and 12 have a pair of mounting studs 14, 16, respectively. These studs 14, 16 project outwardly from the mounting members 10, 12 for attachment respectively to an engine (not shown) and an engine supporting cradle or frame of a vehicle (not shown).

A hollow elastomeric body 18 interconnects the mounting members 10, 12. The body 18 is constructed of natural or synthetic rubber. More specifically, the body 18 may be molded to and about the mounting member 10 and includes an embedded stamped sheet metal retainer 20.

The body 18 defines a hollow cavity 22 for receiving a damping liquid, such as commercial engine antifreeze/coolant. Oppositely located voids 24 are formed in the body 18 between the mounting member 10 and the retainer 20. These voids 24 provide directional dynamic rate control within the elastomeric body 18 itself and form a part of the damping liquid cavity 22. As is known in the art, such voids 24 are especially useful in isolating certain internal combustion engine vibrations.

Together, the mounting member 10, elastomeric body 18 and metal retainer 20 form a first subassembly or cover of the mount assembly. The retainer 20 includes an outwardly projecting collar 26 at its lower periphery. The collar 26 is formed to receive a second subassembly or base. The base comprises the mounting member 12 and elastomeric diaphragm 28 of natural or synthetic rubber, a partition 30 with flow orifices and a sliding gate 32 that acts as a valve, as described in further detail below.

The elastomeric diaphragm 28 includes an annular rim portion 34 having a peripheral groove formed between upper and lower shoulders respectively. The shoulders are flexible so as to receive the outer edge of the partition 30. Thus, the partition 30 is sealingly engaged by the shoulders on opposite sides of the groove.

The mounting member 12 is formed with a collar to receive the rim portion 34 of the diaphragm 28. The collar of the mounting member 12 fits within the collar 26 of the retainer 20. As is known in the art, tabs (not shown) may be provided on the collar 26 and bent over to retain and seal the whole mount assembly.

The elastomeric diaphragm 28 closes the elastomeric body 18 so as to form therewith the closed damping cavity 22. This cavity 22 is divided by the partition 30 into a primary chamber 46 enclosed by the elastomeric body 18 and a secondary chamber 48 enclosed by the diaphragm 28.

The partition 30 is formed of non-magnetic material, such as die cast aluminum as shown, or plastic; and includes a pair of plates 50, 52 with matching peripheries. As shown in FIG. 2, these plates span the cavity 22 and cooperate to define a pair of passages or extended damping orifice tracks 54, 56 interconnecting the chambers 46, 48.

Figure 3:
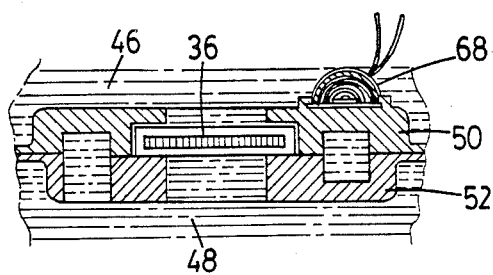
FIG. 3 is a partial cross-sectional view through the partition along line 3—3 of FIG. 2.

The decoupler 36 (see FIGS. 2 and 3) is a rectangular plate formed of metal or plastic positioned in a central opening 57. The decoupler is mounted for limited up and down reciprocal movement in the partition 30. The respective upper and lower faces of the decoupler 36 are directly engaged by the damping liquid within the primary and secondary chambers 46, 48. As a result, the decoupler 36 provides reciprocating movement in response to minimum amplitude alternating pressure build-ups in the chambers 46, 48 acting on opposite faces of the decoupler. This reciprocating movement within the plates 50, 52 toward and away from the chambers 46, 48 produces a limited volume change in primary and secondary chambers that effects hydraulic decoupling.

Two flow passages 54, 56 are provided in the partition 30 to provide a flow of damping fluid between the primary and secondary chambers 46, 48 respectively. As shown, the longer passage 54 communicates between the two chambers via openings 51 in plate 50 and 58 in plate 52. The length of passage 54 is variable depending on the placement of opening 58. Accordingly, the damping characteristics of the mount can be fine tuned to the particular resonance frequencies of the component being damped. The opening 51 to the passage 54 is constantly open providing full time damping.

One important aspect of the present invention lies in the operation and structure of the gate 32 regulating the size of the opening 53 to the shorter passage 56. This arrangement allows an additional and variable flow of damping liquid between chambers 46 and 48. When the gate 32 is fully open, damping liquid flows from the primary chamber 46 along both the shorter and longer passages 56, 54 providing a low damping rate. As the opening 53 is proportionally closed by the movement of gate 32, the flow of damping fluid along the shorter passage 56 decreases in the same proportion. This provides an infinitely variable damping level over a range of frequencies from the low (both tracks open) level to the high (shorter track fully closed) level (compare FIGS. 6-8).

A linear solenoid 68 of any suitable conventional type, is mounted on the partition plate 50. The output shaft of the solenoid is directly connected to the sliding gate 32 (see FIG. 4).

This solenoid typically includes a spring biased tapered armature as shown in FIG. 4A which provide proportional solenoid shaft output. Thus, the sliding gate is positioned across the opening 53 according to the input current applied to the solenoid 68. In this manner, the sliding gate is variably positioned in order to provide variable damping to the mount assembly 10. It is also contemplated that a rotary gate activated by a rotary solenoid of any suitable conventional type may also be employed as shown in FIG. 5.

The circuit for controlling the damping characteristics of the mount assembly 10 is shown schematically in FIG. 1. As shown, the solenoid 68 is connected to an electric controller 78 by wiring leads 80. The controller 78 is responsive to a microprocessor 84 through line 86. The microprocessor 84 is connected through signal feed lines 88 to a series of transducers 90, which form a means for sensing vehicle operating conditions and resulting vibrations.

The transducers 90 are mounted on board the vehicle, such as on the engine and the frame of the vehicle at various locations in order to instantaneously sense vibration amplitude and frequency during operation. To be more specific, transducers 90 may be strain gauges positioned in engagement with the engine block and frame adjacent the mount assemblies. These transducers 90 are sensitive to the full range of vibratory conditions produced, during, for example, idling, rapid acceleration and deceleration, highway cruising and engine lugging.

The information relative to engine vibration amplitude and frequency that is sensed by the transducers 90 is immediately communicated along the lines 88 to the microprocessor 84. The information is then processed and a pre-programmed response output signal is communicated along line 86 to the individual controller 78 for the mount assembly. The controller 78 then applies current to the solenoid 68. The resulting magnetic field produced by the internal solenoid coil imparts proportional movement to the gate 32. For the gate 32 to move across opening 53, the microprocessor 84 increases the current applied to the solenoid 68. In this way, the gate 32 is positioned in an infinitely variable fashion across the opening 53, thereby varying the flow along the shorter track 56 in relation to the flow along the longer unvalved track 54.

The damping characteristics of the hydraulic mount assembly 10 are adjusted in response to perceived vehicle operating conditions and resulting vibrations to provide maximum performance at all times. During smooth engine idling and other relatively smooth operating conditions, low amplitude vibrations are produced. The decoupler reciprocates in response to these low amplitude vibrations and provides little damping effect.

The importance of the present invention becomes apparent when its response to higher vibration levels is considered. When the solenoid is fully energized, the gate fully uncovers the opening 53 and damping flow occurs along both the shorter track 56 and the longer track 54. This position provides a relatively low damping level of the range to compensate for medium to rough idle. In other words, as vibration levels increase, say from smooth to rough idle, the decoupler reaches the limit of its compensating action, and the flow of damping liquid between the primary and secondary chambers is primarily through the shorter track 56 (see FIG. 6). Although the flow occurs primarily along the short track 56, it also occurs along the long track 54 to a more limited degree providing a combination damping action.

When the solenoid is deenergized, the gate 32 covers the opening 53 completely (see FIG. 8), allowing damping fluid flow along only the longer track 54 providing a high level of damping. The resulting stiffness provides a more effective isolation against high amplitude vibrations such as occur during engine lugging, hard cornering or other severe conditions of operations.

When the gate partially covers the opening 53 (see FIG. 7), it creates a damping stiffness between the low and high levels. Since the gate position is continuously variable across the opening 53, an infinite number of damping levels can be created between the low (gate fully open) damping level and high (gate fully closed) damping level. Accordingly, a full range of damping is provided. After the high level of damping is reached with the valved shorter track 56 being fully closed, the flow is exclusively along the longer track 56. In this mode the resistance to liquid flow is the greatest, and thus damping is at a maximum. Also, as the changes in damping requirements occur, there is a smooth transition. This action represents a significant improvement over the stepped transition dampeners of the earlier disclosures; thus allowing for a more refined response to vehicle and road conditions.

In summary, numerous benefits result from employing the concepts of the present invention. The hydraulic mount assembly incorporates an infinitely variable damping system including a gate 32 that acts in response to a solenoid actuator 68. Energization of the solenoid in response to sensed vehicle operating and road conditions serves to position the gate 32 to provide flow in proportion to the requirement over a selected range of damping. Thus the selective flow through passage 54 or a combination of passages 54 and 56 between the chambers 46 and 48 is infinitely variable. Advantageously, smooth transitional changes in the damping and rate characteristics of the mount assembly 10 are possible.

The transducers 90 instantaneously sense the amplitude and frequency of vibrations being produced at any given time and the pre-programmed microprocessor 84 instantaneously processes the information to select the most desired damping rate. Because the damping idealy matches the need over the range of the system, more efficient and effective response and precise control of vibration and noise is assured.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principals of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

We claim:

1. A hydraulic mount assembly providing variable damping characteristics comprising:

a pair of mounting members;

an elastomeric hollow body connected to said mounting members;

an elastomeric diaphragm closing said hollow body and forming therewith a closed cavity that is filled with liquid;

means for partitioning said cavity into a primary chamber and a secondary chamber enclosed by said diaphragm, said partitioning means including an opening and first and second elongated orifices communicating in parallel relationship between said chambers, said first orifice being open providing a continuous path for flow of liquid between said primary and secondary chambers at all times;

decoupler means positioned with said opening in said partitioning means;

valve means for providing an infinitely variable rate of liquid flow through said second "flow passage" orifice between said primary and secondary chambers to provide a variable damping effect to said hydraulic mount assembly;

means for sensing vehicle operating conditions and resulting vibrations;

means for controlling said valve means in response to said means for sensing vehicle operating conditions so as to allow the damping characteristics of said mount assembly to be tuned.

2. A hydraulic mount assembly according to claim 1 in which said orifices are of different length.

3. A hydraulic mount assembly according to claim 1 in which said second orifice is substantially shorter in length than said first orifice.

* * * * *